(12) United States Patent
Scofield et al.

(10) Patent No.: US 8,791,838 B2
(45) Date of Patent: Jul. 29, 2014

(54) PARKING RESOURCE MANAGEMENT

(75) Inventors: Christopher L. Scofield, Seattle, WA (US); Kush G. Parikh, Kirkland, WA (US)

(73) Assignee: INRIX, Inc., Kirkland, WA (US)

( * ) Notice: Subject to any disclaimer, the term of this patent is extended or adjusted under 35 U.S.C. 154(b) by 0 days.

(21) Appl. No.: 13/443,354

(22) Filed: Apr. 10, 2012

(65) Prior Publication Data
US 2013/0265174 A1 Oct. 10, 2013

(51) Int. Cl.
*B60Q 1/48* (2006.01)
(52) U.S. Cl.
USPC ........... 340/932.2; 340/933; 705/28; 705/1.1; 705/26.8
(58) Field of Classification Search
USPC .................. 340/932.2, 933; 705/28, 1.1, 26.8
See application file for complete search history.

(56) References Cited

U.S. PATENT DOCUMENTS

| | | | |
|---|---|---|---|
| 5,339,000 A | 8/1994 | Bashan et al. | |
| 6,426,708 B1 | 7/2002 | Trajkovic et al. | |
| 7,834,778 B2 | 11/2010 | Browne et al. | |
| 7,866,910 B2 | 1/2011 | Gustafson et al. | |
| 7,899,583 B2 | 3/2011 | Mendelson | |
| 7,909,558 B2 | 3/2011 | Benedict et al. | |
| 2003/0005876 A1 | 1/2003 | Boswell | |
| 2004/0254840 A1* | 12/2004 | Slemmer et al. | 705/22 |
| 2005/0236202 A1 | 10/2005 | Walworth | |
| 2006/0228196 A1 | 10/2006 | Li | |
| 2006/0250278 A1* | 11/2006 | Tillotson et al. | 340/932.2 |
| 2007/0008181 A1* | 1/2007 | Rollert et al. | 340/932.2 |
| 2007/0294952 A1 | 12/2007 | Li | |
| 2008/0075566 A1 | 3/2008 | Benedict et al. | |
| 2010/0014950 A1 | 1/2010 | Blackmore | |
| 2011/0022427 A1 | 1/2011 | Dayan | |
| 2012/0095790 A1* | 4/2012 | Stefik et al. | 705/5 |

OTHER PUBLICATIONS

Int. Search Report cited in PCT Application No. PCT/US2013/035574 dated Jun. 17, 2013, 8 pgs.

* cited by examiner

*Primary Examiner* — Daryl Pope

(57) ABSTRACT

Among other things, one or more techniques and/or systems for parking based route navigation and/or parking resource management are disclosed to facilitate navigation to parking spots associated with a destination and/or management of respective parking spots. Navigation may be provided to a parking spot based upon parking criteria (e.g., such as distance to a destination and/or costs associated with the parking spot). Additionally, navigation (e.g., instructions, alternate transport, such as public transit) from the parking spot to the destination may be provided. Parking spots may be reserved by a parking management system based upon reservations received through a parking based route navigation system. Travelers may be re-routed based upon parking factors (e.g., traffic around a parking location, parking density, etc.). Accordingly, travelers may be routed to a destination in a more efficient manner and/or a management system may price and/or allocate parking spots in a desired manner.

20 Claims, 10 Drawing Sheets

PARKING RESOURCE MANAGEMENT

BACKGROUND

Within the field of computing, route navigation may comprise receiving a destination and providing navigation instructions (e.g., turn by turn directions) thereto. For example, an application may provide directions to a destination based upon a location of a traveler (e.g., a current location for the traveler). Such an application may, for example, execute on a location-aware device, such as a smartphone equipped with a global positioning system (GPS), for example. A location aware device may also have access to mapping information and be capable of providing routing information, for example. Devices such as this may also generate traffic information (e.g., speeds of vehicles traveling along a particular span of roadway, estimated time until arrival at a destination) or infer traffic conditions, for example.

SUMMARY

This Summary is provided to introduce a selection of concepts in a simplified form which are further described below in the Detailed Description. This Summary is not intended to identify key factors or essential features of the claimed subject matter, nor is it intended to be used to limit the scope of the claimed subject matter.

Among other things, one or more techniques and/or systems for providing navigation to one or more parking spots are disclosed, such as to facilitate navigation to a venue where parking may not be available on-site (e.g., at the venue), for example. Parking based route navigation may comprise, for example, receiving a destination and providing navigation from a first location (e.g., a current location and/or a user input location) to a parking spot associated with the received destination. For example, a traveler may be attending a sporting event (e.g., a professional football game) where parking is generally unavailable and/or undesirable on-site at least because of cost of parking, availability, and/or crowds. To this end, a traveler may be provided with directions to a parking spot near (e.g., associated with and/or within a reasonable distance from) the football stadium based upon an input comprising the football stadium as a destination (e.g., entered via a navigation system), for example. In one exemplary embodiment, a traveler may be provided with directions to a parking lot (e.g., comprising one or more parking spots and/or associated coordinates) several blocks away from the football stadium (e.g., a destination) based upon a proximity (e.g., distance, walking distance, travel time, availability of public transportation, etc.) of the parking lot to the football stadium. In another exemplary embodiment, the traveler may be directed to a parking lot and/or parking spot based upon a cost associated with the parking spot, for example. Accordingly, parking based route navigation may thus be provided (e.g., based upon any number of factors).

In one embodiment for parking based route navigation, an option associated with enabling the parking based portion of route navigation may be provided. For example, a traveler may be able to select preferences to enable and/or disable route navigation (e.g., directly) to a parking spot. For example, if parking based route navigation is enabled, a traveler may be provided with directions to a parking spot associated with the destination, while directions to the destination may be provided if the parking based route navigation is disabled. In another exemplary embodiment, the option may be automatically selected and/or inferred from a variety of factors (e.g., time of day, associating the destination with an event, etc.), for example. Further, navigation may be provided from the parking spot to the destination (e.g., based upon walking distance, whether walkways are covered to protect travelers against the elements such as wind, rain, and/or snow, current weather conditions, and/or by providing public transit to facilitate travel from the parking spot to the destination), for example. According to one aspect, a list of parking spots (e.g., a suggested parking spot and/or one or more alternative spots) may be provided and/or ranked based upon a selection algorithm and/or traveler preferences (e.g., cost). To this end, a parking spot selection may be received (e.g., from a traveler and/or based upon a selection algorithm), and a parking data feed may be updated accordingly. For example, if a traveler reserves a parking spot (e.g., based upon the parking spot selection), a parking data feed may be updated to reflect such usage (e.g., based upon an actual arrival time, anticipated arrival time, actual departure time, and/or an anticipated departure time associated with the reservation and/or parking spot). Therefore, it is believed that parking based route navigation promotes more efficient route navigation, for example.

Additionally, one or more techniques and/or systems for parking resource management are disclosed to manage parking spots and/or reservation(s) thereof. The parking resource management may comprise aggregating (e.g., received from parking meters, parking lots, parking garages, surface lots, etc.) parking information (e.g., a status of a parking spot, such as taken, occupied, reserved, vacant, or open, parking space distribution, parking lot density, anticipated traffic, satisfaction level, etc.) associated with parking spots into a parking data feed and updating a parking database based upon the parking data feed (e.g., feedback indicating a status change and/or a potential status change for a spot, such as a reservation, inquiry, and/or confirmation), for example. That is, for example, parking resources may be managed by tracking (e.g., aggregating) parking spots and properties associated therewith (e.g., a number of available parking spots, a location associated with respective parking spots, and/or a cost associated with respective parking spots) and consolidating respective properties into a parking data feed. To this end, the parking data feed may be modified based upon a change of status (e.g. such as when a reservation for a parking spot is made, a car parks in a spot, and/or a car leaves a spot) associated with a parking spot, for example. In one exemplary embodiment, the parking data feed may be updated to reflect a reservation (e.g., and/or a cancellation) for a parking spot upon a traveler making the reservation. In another exemplary embodiment, the parking data feed may be updated upon detecting a car occupying and/or vacating a parking spot, for example. Accordingly, parking resource management may thus be provided.

According to one aspect, parking information (e.g., related to a status of a parking spot, such as occupied, vacant, reserved, and/or related to coordinates associated with the parking spot) may be aggregated to the parking data feed from a variety of sources, such as parking meters, parking garages, surface lots, on street parking, cameras, sensors, global positioning devices, or from a parking based route navigation system (e.g., configured to provide confirmation, verification, and/or reservation of a spot, etc.), for example. That is, for example, the parking data feed may be indicative of parking properties (e.g., number of available spots, parking distribution, parking density, etc.) for an area. In one embodiment, an alert may be provided based upon a proximity of a traveler to a parking spot associated with a reservation. For example, if the traveler is associated with the reservation, the alert may indicate that the traveler has arrived at the reserved parking spot. Conversely, if a traveler is not associated with a parking spot (e.g., reserved parking spot), an alert may be provided to indicate that the traveler should not park in the parking spot at least because the spot is already reserved and/or is not the spot reserved for the traveler. In one exemplary embodiment, a map of parking spots may be provided, comprising indicators for occupied spots, reserved spots, and/or vacant spots, for example. In this manner, a traveler may view a layout of a parking lot, where reserved and available spots are indicated differently (e.g., different colors), for example, so that the traveler can select/reserve an available spot or even outbid someone else to take over an already reserved spot (e.g., front row) via an interactive user interface, for example. In another embodiment, reservations may adjusted/re-routed based upon parking factors (e.g., parking distribution and/or parking density) associated with parking for an area (e.g., parking lots, parking garages, surface lots, parking meters, etc.). Thus, if a parking garage is near full capacity, a traveler with a reservation in the parking garage may, for example, be re-routed to another parking garage (e.g., comprising less traffic and/or fewer occupied spots). In one embodiment, a traveler may receive a digital ticket on a portable device (e.g., cell phone, personal desktop assistant, etc.) and have the digital ticket scanned (e.g. via a barcode scanner at an entrance, exit, and/or ticket booth) for access to and/or departure from a parking garage, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

The application is illustrated by way of example and not limitation in the figures of the accompanying drawings, in which like references indicate similar elements and in which.

DETAILED DESCRIPTION

Figure 1:
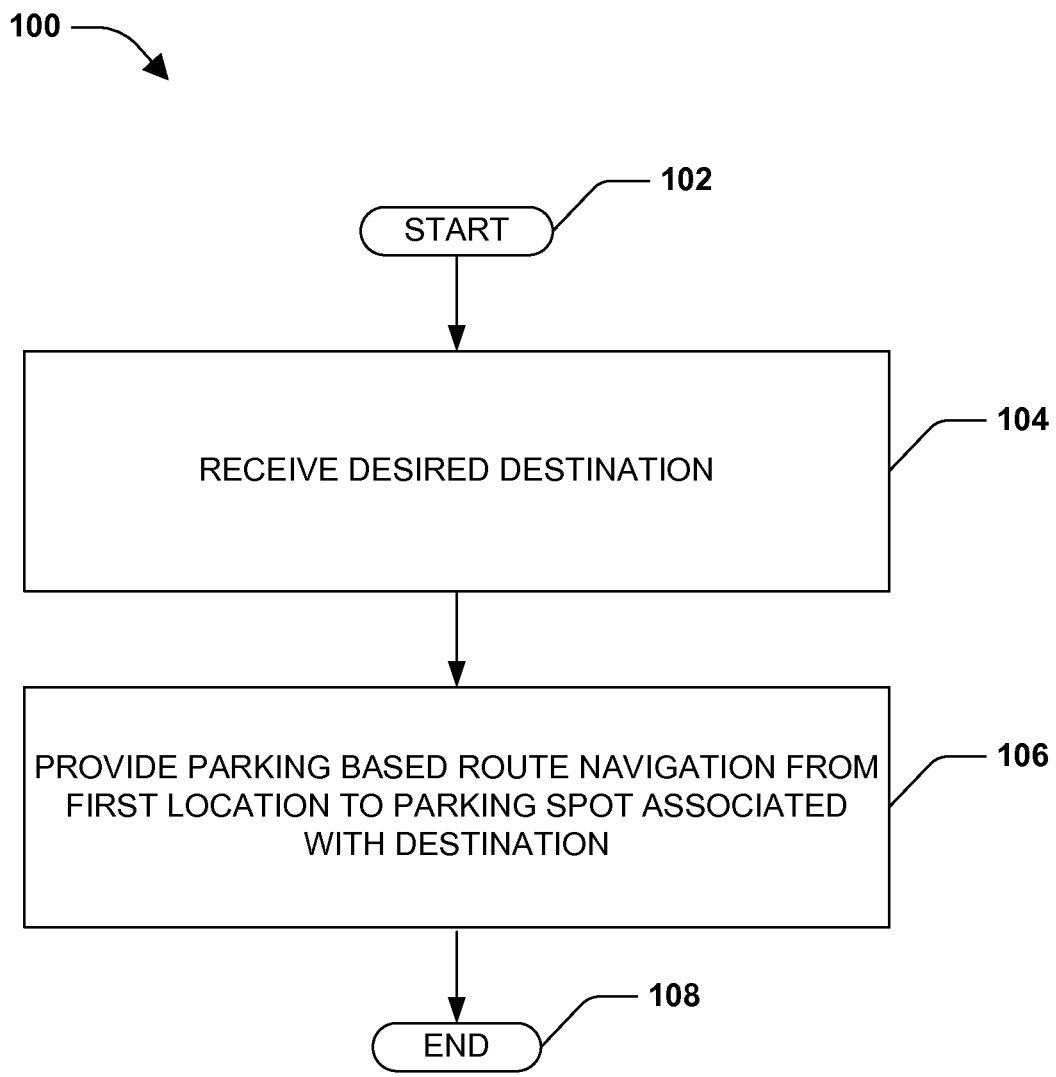
FIG. 1 is a flow diagram of an exemplary method for parking based route navigation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more techniques and/or systems for parking based route navigation are disclosed to facilitate navigation to parking spots associated with destinations. Navigation may be provided to a parking spot based upon a distance to a destination and/or costs associated with the parking spot, for example. Moreover, navigation (e.g., instructions, alternate transport, such as public transit, etc.) from the parking spot to the destination may be provided. Additionally, one or more techniques and/or systems for parking resource management are disclosed to facilitate management and tracking of parking spots. For example, parking spots may be reserved by a parking management system based upon reservations received through parking based route navigation systems. Moreover, travelers may be re-routed based upon traffic around a parking location, parking density, etc. Accordingly, travelers may be routed to destinations in a more efficient manner. It will be appreciated that a parking spot, parking garage, parking deck, parking meter, and/or parking lot does not have to be part of and/or attached to a destination facility and/or venue, etc.

FIG. 1 is a flow diagram of an exemplary method for parking based route navigation. The exemplary method 100 begins at 102 and receives a destination (e.g., desired destination) at 104. The desired destination may be received from a traveler and/or entered via a global positioning system (GPS) equipped device (e.g., a cell phone, car navigation system, etc.), for example. In one embodiment, the desired destination may comprise an event (e.g., rock concert, and a destination may be determined and/or inferred based upon a location of the event), for example.

Parking based route navigation may be provided 106 from a first location (e.g., a current location, an input location, an inferred location, etc.) to a parking spot associated with the destination, for example. That is, for example, if a traveler desires to attend a professional football game (e.g., a desired destination), route navigation may be provided from a current location (e.g., a first location) associated with the traveler to a parking spot near (e.g., associated with) the football stadium. To this end, travelers may be provided with more efficient navigation instructions. In one embodiment, parking spots may be associated with corresponding coordinates, for example. The exemplary method 100 ends at 108 thereafter.

Figure 2:
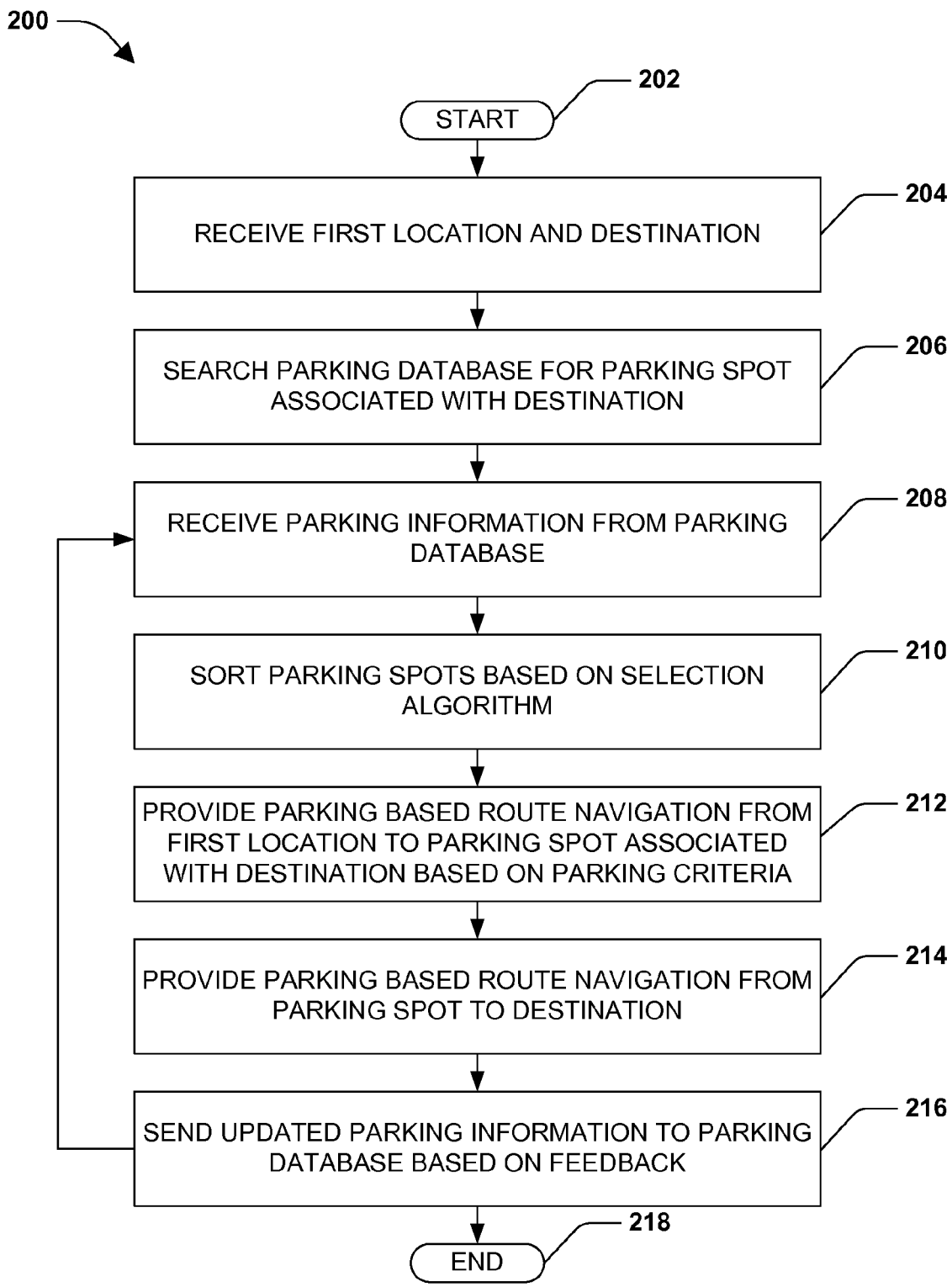
FIG. 2 is a flow diagram of an exemplary method for parking based route navigation.

FIG. 2 is a flow diagram of an exemplary method for parking based route navigation. The exemplary method 200 begins at 202, and a first location and/or a destination may be received at 204. According to one aspect, the first location may be based upon a current location of a traveler (e.g., determined using near field communication, GPS, satellite, etc.) and/or a user input location (e.g., manually entered). Parking based route navigation may be provided based on an enable and/or disable option (e.g., selected by a traveler), for example. In one embodiment, when parking based route navigation is enabled, turn by turn directions may be provided to a parking spot associated with the destination. In another embodiment, turn by turn directions may be provided (e.g., directly and/or without reference to parking spots) to the destination if parking based route navigation is disabled, for example. According to one aspect, the parking based route navigation option may be inferred, selected, and/or automatically enabled based upon parking factors, for example. That is, for example, parking based route navigation may automatically be enabled in scenarios where there is a likelihood (e.g., higher likelihood) of navigation to a parking spot based on the destination. If a traveler is attending a professional football game (e.g., the football game is entered as a destination), for example, there may be a high likelihood that the traveler will navigate to a parking spot rather than (e.g., directly) to a destination such as a football stadium. The likelihood of navigation may be determined from traveler data (e.g., historical travel data, a majority of travelers quit navigation prior to arriving at a destination such as a football stadium) and/or individually by destination (e.g., a particular destination does not have a designated parking lot), for example. According to one aspect, parking based route navigation may be automatically enabled and/or disabled based on the time of day, anticipated arrival time at the destination, anticipated departure time, the day of the week, etc. For example, if it is determined that a traveler will arrive at a destination at approximately 2 AM, then parking based route navigation to a parking spot may be automatically disabled at least because it is unlikely that the destination will not have parking spots available (e.g., because attendance is likely to be low at that time of day).

According to yet another aspect, parking based route navigation may be enabled and/or disabled based upon real time data indicative of a parking situation associated with the destination, for example. That is, for example, If there are twenty parking garages located near a destination, and nineteen of the twenty garages are full and/or close to full capacity (e.g., percent of parking spaces occupied, parking density of an area), parking based route navigation may be automatically enabled for a traveler heading towards the destination (e.g., because without the same the traveler may spend an inordinate amount of time driving around trying to find an available parking spot).

At 206 in the example method 200, a parking database may be searched for a parking spot associated with the destination received at 204, for example. Search criteria (e.g., parking criteria) may be used to filter parking spots based on desirability, for example. In one embodiment, parking criteria may be determined by presenting a traveler with questions and receiving associated answers. In another embodiment, parking criteria may be entered as a set of user preferences, for example. A traveler may indicate a desired walking distance (e.g., a parking radius indicative of a distance and/or proximity from the parking spot to the destination not to be exceeded when searching for the spot). Another embodiment may comprise filtering parking spots based upon a cost preference (e.g., a preference indicated that the parking spot should not exceed $X dollars). In one embodiment, parking spots may be selected (e.g., via a user preference) based on whether the parking spot is covered (e.g., a covered garage) and/or whether the parking spot provides covered walkways to the traveler's destination, for example. Accordingly, one aspect provides for parking criteria based on current weather conditions. That is, for example, if the weather is rainy, a traveler may be directed to a parking spot that comprises cover and/or covered walkways to the destination. According to another aspect, parking based route navigation may be provided utilizing mass transit and/or public transit, for example. A traveler may indicate a preference for mass and/or public transit (e.g., average wait time for the public transit, such as a trolley comes approximately every two minutes), or be provided with public transit via a selection algorithm, for example. Public transit may enable a traveler to be transported closer to a destination than by car in some scenarios (e.g., and thus be selected via the selection algorithm). That is, for example, if a street is shut down (e.g., for a parade, and detected based on an event, map, application, et.), mass transit (e.g., subway, trolley, bus, etc.) may be able to drop a traveler off closer to a location than parking via a car, for example. According to another aspect, mass transit may comprise a lower cost than a parking spot, and thus be selected and/or incorporated into the parking based route navigation. Parking information may be received from the parking database at 208. For example, parking information may comprise one or more parking spots returned in response to the received destination, as well as criteria associated with/used in returning the one or more parking spots. To this end, parking information may comprise one or more suggested parking spots and/or one or more alternative parking spots. Parking information may be returned at 208 based upon parking criteria (e.g., cost of a parking spot, distance of the parking spot from a destination, whether the parking spot is covered, whether the destination is accessible via walkways to protect the traveler from the elements, whether mass and/or public transit may be incorporated, estimated arrival time, estimated departure time, etc.). Parking criteria may comprise average wait time for a parking spot, type of parking spot, types of payments accepted, whether a garage will be open at an anticipated departure time, likelihood of availability of a spot, average parking lot fill time, etc. Such examples are not intended to be a comprehensive list of all such criteria/possibilities.

A selection algorithm may be employed at 210 to facilitate sorting and/or ranking of available parking spots based upon the parking information, parking database, and/or parking criteria, for example. In one embodiment, if a traveler indicates a covered parking spot is desired (e.g., via selection of an associated option), parking spots associated with covered walkways to the destination may be ranked higher than parking spots associated with no covered walkways at least because an inference pertaining to weather may be drawn (e.g., based on selection of the covered spot preference). In another embodiment, the selection algorithm may be configured to sort 210 based on traveler preferences (e.g., historical choices, a hierarchy of preferences, and/or inferred preferences). According to one aspect, if a traveler historically chooses higher cost parking (e.g., closer to a destination) over lower cost parking (e.g., farther from the destination), parking spots may be ranked accordingly. In one embodiment, a traveler may manually rank preferences in a hierarchical order (e.g., covered parking preferred over less expensive parking), for example. In another embodiment, a hierarchical order may be automatically determined based upon parking inferences, for example. To this end, parking inferences may comprise inferences based upon current weather conditions, for example. That is, for example, if it is snowing at the destination, the hierarchical order may be rearranged such that cover takes precedence over cost (e.g., rank a $10 covered spot higher than an $8 uncovered spot) at least because the parking inference may be based upon current weather.

At 212, parking based route navigation may be provided from a first location to a parking spot associated with the destination. Further, the parking based route navigation may be based upon factors, such as parking criteria, for example. In one embodiment, a traveler may be directed to different parking spots depending on the time of day and/or day of the week, for example. That is, for example, if a traveler is arriving at a destination at 8 PM, parking meters may be free, so parking based route navigation may provide for directions from the first location to a parking meter. Further, the parking based route navigation may take an estimated departure time into account, for example. That is, for example, if the traveler anticipates an arrival time of 8 PM, but plans to stay (e.g., an estimated departure) until 3 PM the next day (e.g., when parking meters will be in effect), other parking options may be considered and/or presented to the traveler at least because the traveler may not desire to be inconvenienced by the parking meter (e.g., have to put money in the meter in the middle of the night). According to one aspect, parking criteria received may be indicative of whether a user desires a parking spot with one or more surrounding vacant spots, for example. To this end, a parking spot surrounded by vacant spots may be associated with a higher ranking, for example. Additionally, parking based route navigation to a parking spot 212 may comprise sending alerts to a traveler based on a location associated with the traveler. For example, if a traveler attempts to park in a parking spot other than a corresponding spot reserved for the traveler, an alert may be generated, sent and/or received by a parking based route navigation system. In one embodiment, alerts may be sent and/or received to guide a traveler to a parking spot and/or to confirm that the traveler has parked in a reserved spot.

After a traveler arrives at a parking spot, parking based route navigation may be provided from the parking spot to the destination 214, in addition to the parking based route navigation 212. The parking based route navigation 214 from the parking spot to the destination may comprise public transit, for example. In one embodiment, if a traveler reserves a spot at a parking garage, the reservation may comprise public transit to the destination, for example. That is, for example, if a parking garage is located farther away than a preferred walking distance (e.g., a preference selected by a traveler), parking spots outside of the walking distance radius may be selected by providing public transit (e.g., metro bus, subway, rental bikes, etc.) to the destination. The cost, ticketing, and/or arrangements may be incorporated into a ticket (e.g., digital ticket on a portable device) for quicker access, for example. The digital ticket may be sent to and/or received by a portable device and may comprise a barcode (e.g., or other type of code) to facilitate scanning, for example.

It will be appreciated that parking based route navigation of 212 and/or 214 may comprise a digital ticket associated with parking and/or transportation to a destination, for example. In one embodiment, a portable device associated with the traveler (e.g., cell phone, personal digital assistant, navigation system, etc.) may receive a digital ticket to facilitate entry into and/or exit of a facility and/or transportation associated therewith. For example, a parking garage and/or parking deck may have a scanner for reading digital tickets, and may grant a traveler access based upon a scan of the digital ticket on the portable device. According to another aspect, public transit and/or mass transit of 214 may scan the digital ticket to relay the traveler to and/or from the destination and parking spot.

The parking database may be updated 216 based upon updated parking information and/or feedback (e.g., parking data feed, etc.) indicating a status of a parking spot, for example. In one embodiment, updated parking information may be sent 216 based upon an actual arrival of a traveler at a parking spot. For example, the actual arrival may be determined based on a detection of arrival (e.g., manual detection and/or automatic detection), GPS associated with the traveler, a barcode scan, a camera associated with the parking spot, a manual entry made by a parking attendant, and/or payment of a fee (e.g., at an electronically monitored parking meter). In another embodiment, updated parking information may be sent based on an anticipated arrival of the traveler, for example. According to one aspect, the feedback (e.g., pertaining to the anticipated arrival) may be based upon a reservation, for example. To this end, feedback comprising a received reservation (e.g., from a traveler) may prompt updated parking information (e.g., indicative of the reservation) to be sent to a parking database, for example. Further, additional updated parking information may be sent to the parking database based on feedback provided at 216. For example, a traveler may indicate an anticipated departure time, thus the anticipated departure time may be sent to the parking database (e.g., to indicate an anticipated block of time that the parking spot may be occupied, for example). In one embodiment, feedback may be based upon an actual departure time and/or an anticipated departure time associated with a reservation and/or a parking spot. An anticipated arrival time may also be calculated based upon a present traveler location and travel condition (e.g., traffic, road construction, etc.) associated with a route to be traveled (e.g., provided at 212), for example. In another embodiment, if a traveler cancels a reservation, updated parking information (e.g., feedback) reflecting the cancellation may be sent to the parking database, for example. The exemplary method 200 ends at 218 thereafter.

Figure 3:
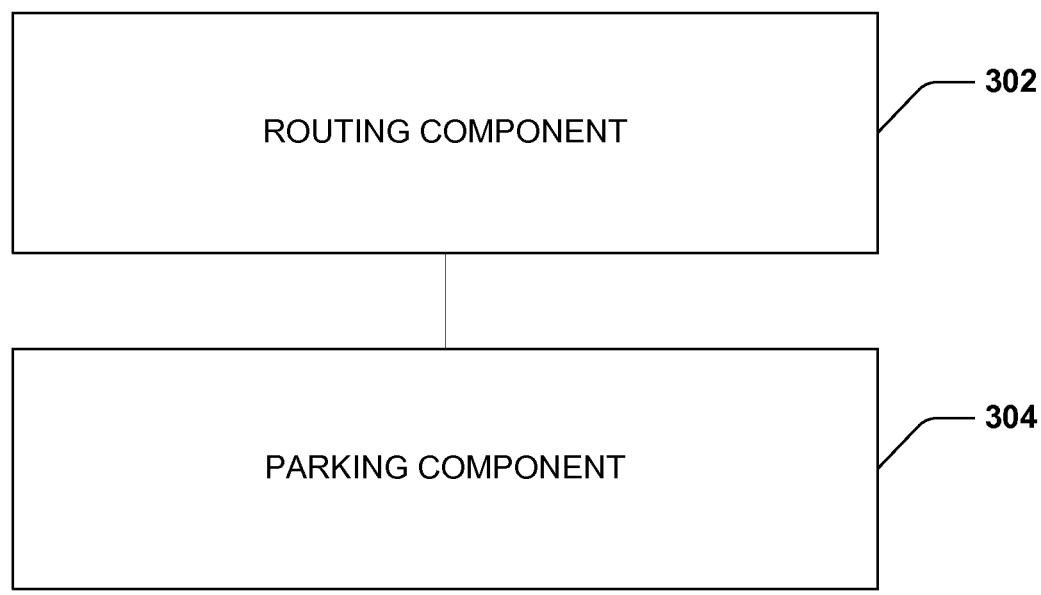
FIG. 3 is a component diagram of an exemplary system for parking based route navigation.

FIG. 3 is a component diagram of an exemplary system for parking based route navigation. A routing component 302 may be configured to receive a destination. The destination may be received as user input from a portable device, such as a cell phone, car navigation system, etc. In one embodiment, the destination may be an event and/or anything associated with a location, for example. That is, for example, if a band is touring the country, and a traveler enters the band as a destination, a current city (e.g., associated with a tour of the band) the band is playing in may be inferred as the destination. For example, if Rock Band plays in Cleveland, Ohio at a First Arena on Monday and Cincinnati, Ohio at a Second Arena on Tuesday, a traveler may be provided with navigation to a parking spot associated with the First Arena if Rock Band concert is entered as a destination on Monday, while navigation to a parking spot associated with Second Arena may be provided if Rock Band concert is entered as the destination on Tuesday. To this end, an event entered as a destination may be associated with a location for the event based on an event schedule, for example.

A parking component 304 may be configured to provide parking based route navigation from a first location to a parking spot associated with a destination, for example. Parking component 304 may be configured to provide navigation to a destination and/or a parking spot associated with the destination.

Figure 4:
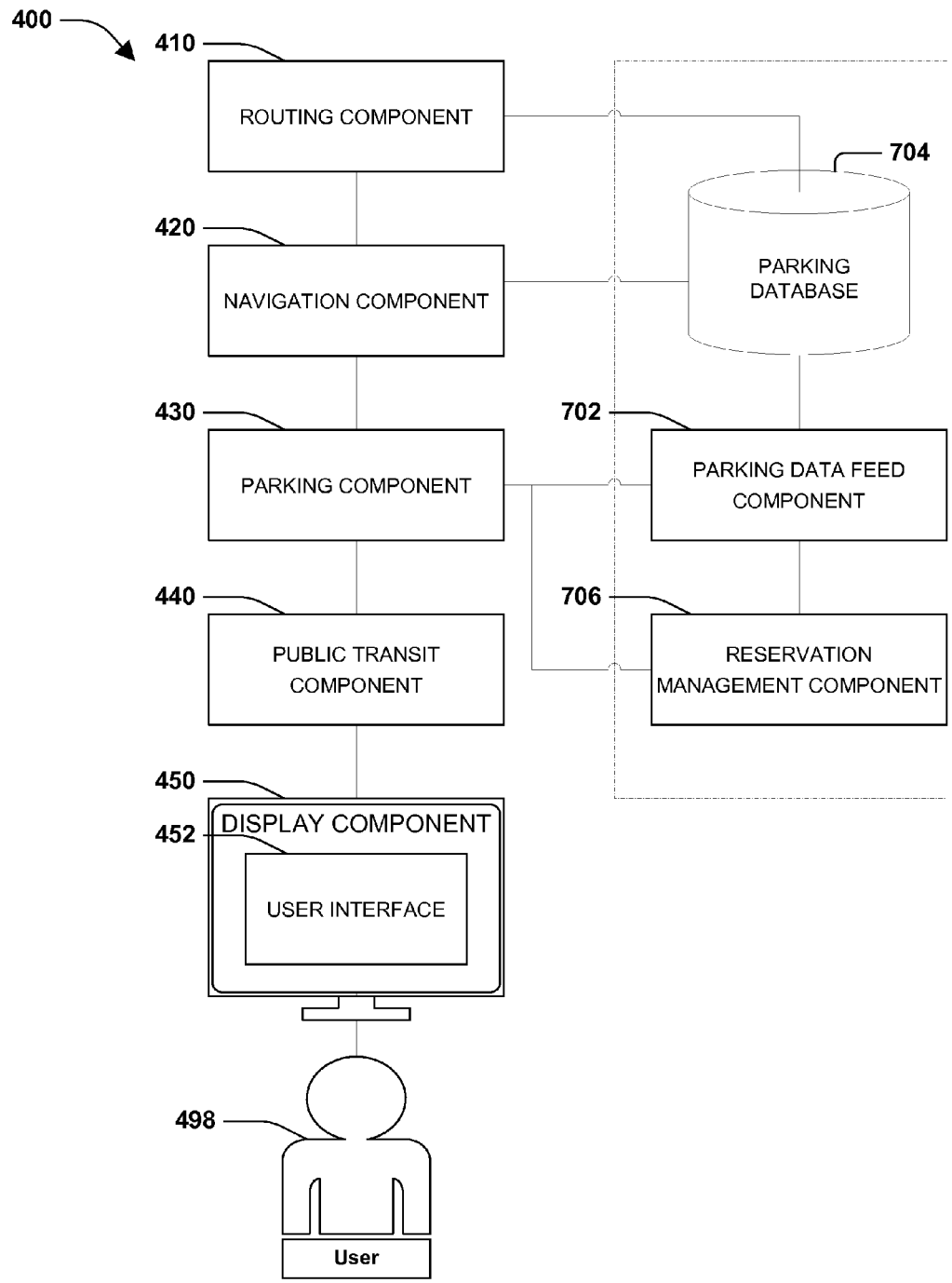
FIG. 4 is a component diagram of an exemplary system for parking based route navigation.

FIG. 4 is a component diagram of an exemplary system for parking based route navigation. A routing component 410 may be configured to receive a first location and a destination.

A navigation component 420 may be configured to search a parking database (e.g., comprising a list of available parking spots) for a parking spot associated with the destination. Additionally, navigation component 420 may be configured to receive parking information from the parking database.

Parking component 430 may be configured to sort the available parking spots based upon a selection algorithm, for example. Additionally, parking component 430 may be configured to enable parking based route navigation by providing turn by turn directions from a first location to a parking spot selected (e.g., automatically selected, algorithm selected, and/or traveler selected) from the available parking spots to the destination. Further, the parking component 430 may provide parking based route navigation based upon factors, such as parking criteria, for example.

A public transit component 440 may be configured to provide parking based route navigation from a selected parking spot to the destination. Additionally, public transit component 440 may be configured to provide public transit from the parking spot to the destination. For example, if a traveler may indicate (e.g., input a walking radius preference) that a five minute walk is the longest he or she is willing to walk from a parking spot to the destination. To this end, parking component 430 may provide a parking spot outside (e.g., comprising a walk longer than) the five minute walking radius by providing public transit to and/or from the parking spot and the destination, for example. Therefore, a fan attending a football game may park in a parking garage farther than a desired walking distance, but take public transit to and/or from the game.

A display component 450 may comprise a traveler interface 452, and the display component may be configured to display turn by turn directions for the traveler 498, selections, and/or options when multiple routes, parking spots, etc. may be chosen.

Parking database 704 may comprise parking information related to parking garages, parking lots, parking meters, and/or parking spots, etc. Parking database 704 may be configured to determine a physical status of a spot, such as whether the spot is occupied or vacant, for example. Additionally, the parking database 704 may be configured to manage times associated with a spot. For example, if a spot is reserved at three PM, parking database 704 may comprise parking information to reflect the reservation accordingly.

Parking data feed component 702 may be configured to update the parking database 704 based upon feedback from at least one of the routing component 410, navigation component 420, parking component 430, and/or public transit component 440, etc. In one embodiment, the feedback may comprise an indication of a status change for a parking spot, and the indication may be physical and/or time based. For example, a physical indication of a status change associated with a parking spot may be a detection indicating that a spot is occupied. A time based indication of a status change may be based upon a reservation that was made, for example.

A reservation management component 706 may be configured to receive reservations, monitor a plurality of parking lots, spots, garages, etc., and route travelers to various parking spots, for example.

Figure 5:
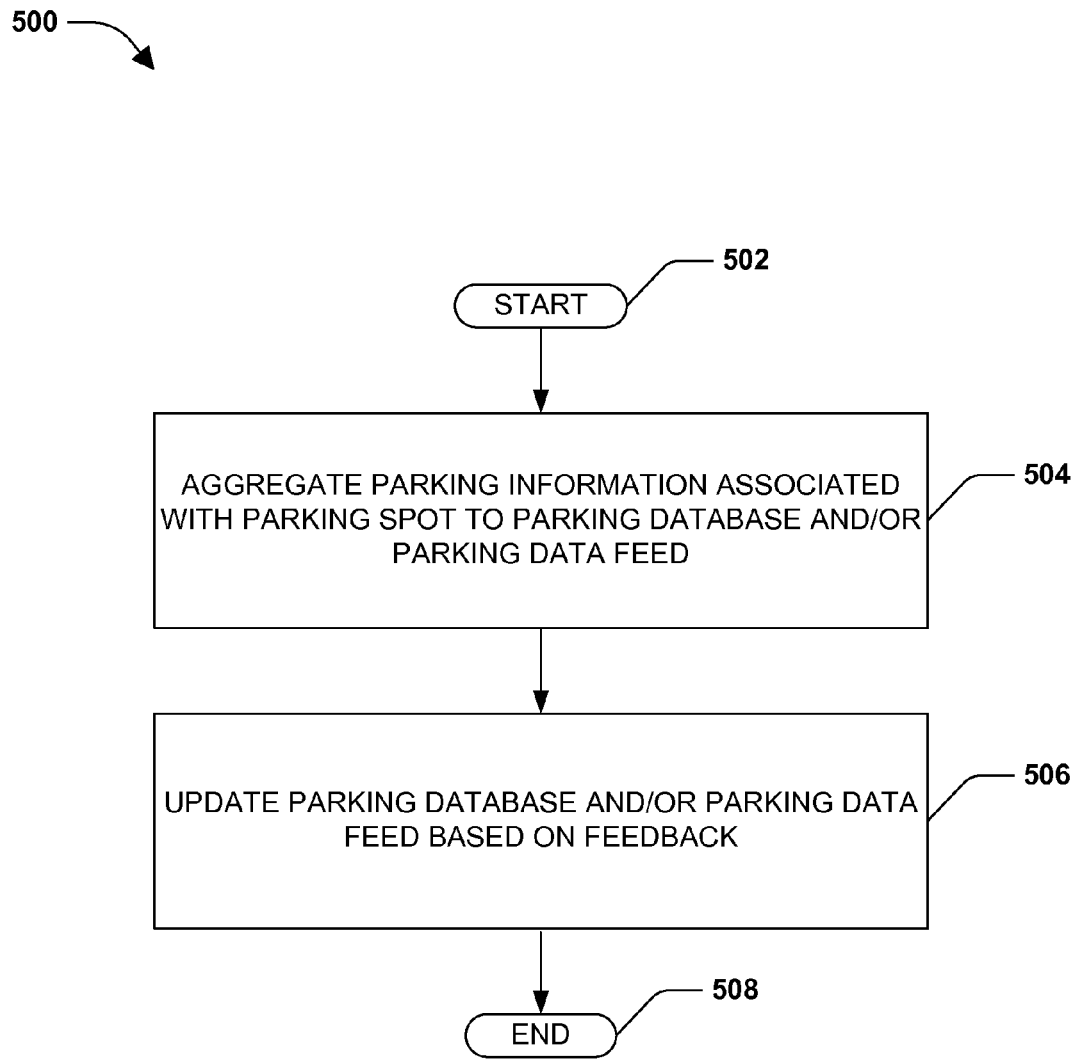
FIG. 5 is a flow diagram of an exemplary method for parking resource management.

FIG. 5 is a flow diagram of an exemplary method for parking resource management. The exemplary method 500 begins at 502 and comprises aggregating parking information associated with one or more parking spots to a parking database and/or a parking data feed at 504. The parking information may comprise status of parking spots, status of reservations associated with parking spots, estimated arrival times, estimated departure times, actual arrival times, actual departure times, historical data, etc.

A parking database may be updated 506, based upon feedback from a parking resource management system, for example. That is, for example, if a traveler makes a reservation (e.g., feedback) via a portable device, a parking data feed may update the parking database accordingly. If the traveler cancels his or her reservation, the parking data feed may update the parking database to reflect the cancellation. In one embodiment, feedback may be provided based upon a physical status (e.g., occupied and/or vacant confirmation), an inquiry regarding availability, and/or a confirmation (e.g., visual indication a traveler has arrived at a parking spot) associated with a parking spot. The exemplary method 500 ends at 508 thereafter.

Figure 6:
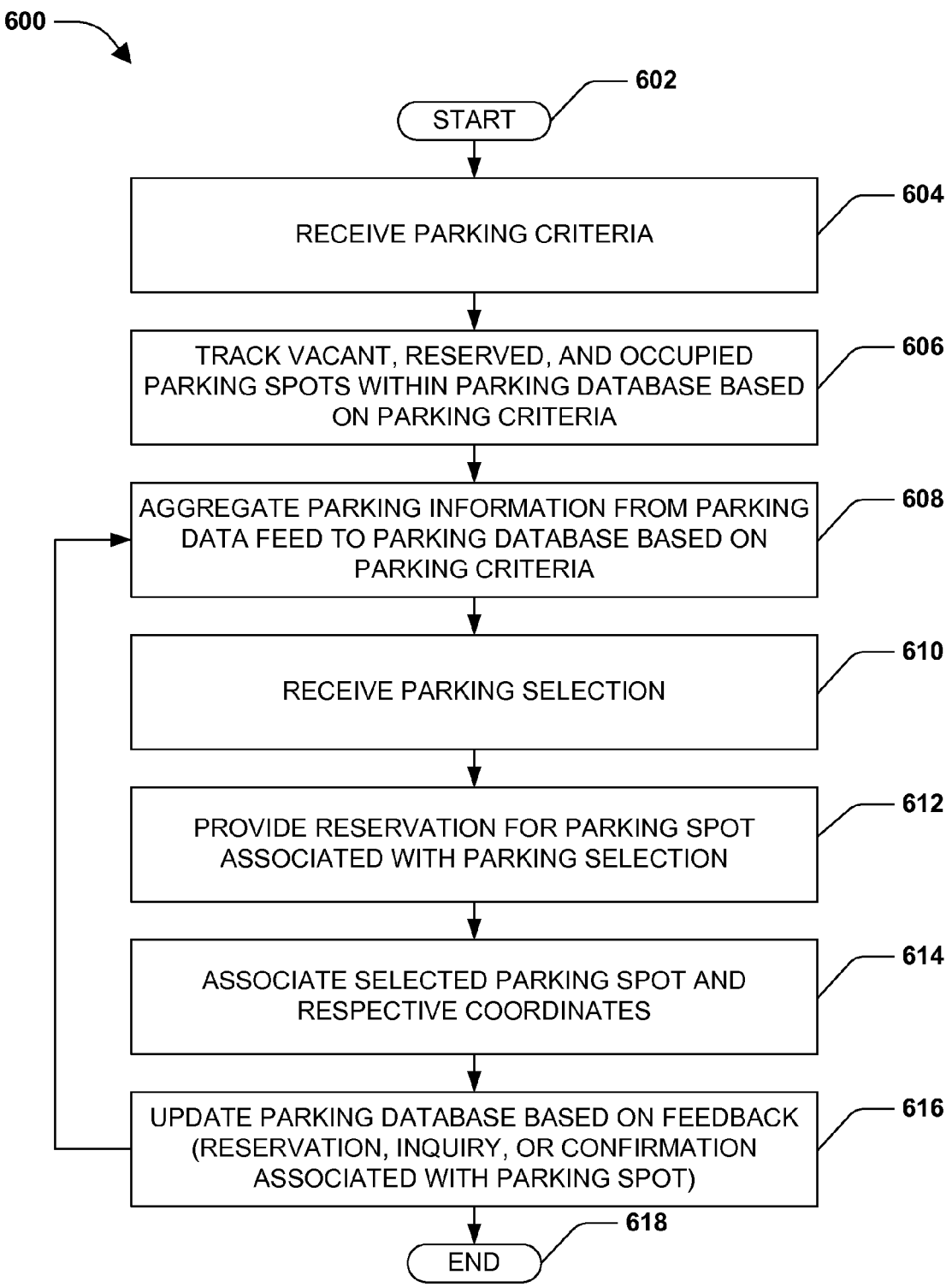
FIG. 6 is a flow diagram of an exemplary method for parking resource management.

FIG. 6 is a flow diagram of an exemplary method for parking reservation management. The exemplary method 600 begins at 602. Parking criteria may be received at 604, for example. In one embodiment, parking criteria comprises options a traveler may select, specify, and/or input. That is, for example, a traveler may specify a walking radius (e.g., a desired walking distance and/or walking time a parking spot may be from a destination), an option for parking based navigation (e.g., whether directions will be to a parking spot or the destination), a public transit option, a sort priority (e.g., sort by distance, cost associated with the parking spot, etc.). According to one aspect, parking criteria may comprise a likelihood that surrounding spots (e.g., spots next to the spot reserved for the traveler) will be empty.

At 606 in the example method 600, parking spots may be tracked according to a status from a parking database, for example. In one embodiment, parking spots may comprise a vacant (e.g., available), reserved, and/or occupied (e.g., taken) status. Moreover, the tracking of 606 may be based upon parking criteria received at 604, for example. Parking spots may be tracked 606 based on information from electronic parking meters, parking lots, surface lots, on street parking, etc. Additionally, parking properties may be tracked and/or associated with respective parking spots, for example. According to one aspect, parking properties may comprise a parking status (e.g., indicative of availability of parking spots, such as vacant, occupied, and/or reserved, etc.) and parking density (e.g., how full a parking garage is, percent capacity of the parking garage occupied, whether consecutive spots are occupied and/or arranged). In one embodiment, a cost associated with a parking spot may be based upon availability of parking in an area. For example, if a parking garage (e.g., an area may be comprised of multiple parking garages) is at 90% capacity, costs associated (e.g., to make additional reservations for the remaining 10% of spots) with remaining parking spots may be adjusted (e.g., increased). To this end, cost may be based upon a number of reservations made (e.g., an influx of reservations) and/or an event (e.g., parking price increase for a game and/or a high number of reservations), for example. Thus, in one example, costs for parking spots may increase even if there is no 'event' (e.g., merely because there happen to be many travelers parking at or around a same time). Further, parking properties may comprise a total number of parking spots, an available number of parking spots, a reserved number of parking spots, an occupied number of parking spots, etc. For example, parking density may be measured for a given row in a garage, in a single garage, and/or in an area (e.g., a one mile radius of a destination). According to another aspect, parking properties may comprise parking distribution (e.g., a profile indicative of how parking spots are occupied, for example). On less busy days, it may be desirable for a parking resource management system to fill up a parking lot using a checkerboard pattern to facilitate quicker parking speeds for example. According to another example, it may be desirable for a parking management system to assign parking spots consecutively (e.g., based on anticipated garage usage). According to one aspect, parking properties may comprise real time pricing associated with a parking spot, for example. That is, if a parking spot generally costs $10, but comprises a price jump to $20 on a game day, such pricing may be tracked 606 and/or aggregated 608 accordingly. Further, parking properties may be tracked 606 based upon satisfaction associated with a parking spot, for example. That is, if a parking garage is poorly lit, located in an undesirable surrounding area, etc., travelers may leave feedback associated with a parking spot, and such feedback may be utilized for future tracking 606 and/or aggregation 608 of available parking spots. In one embodiment, tracking 606 may comprise summarizing statistics associated with parking. For example, if a professional football team holds eight home games a season, parking statistics may be generated and/or tracked using the home game as a parking criterion. That is, for example, parking reservation management may track which parking garages fill up on game day, what time a parking garage fills up, and/or an average departure time for those fans, etc. (e.g., after they finish 'tailgating').

Parking information may be aggregated from a parking data feed configured to monitor parking spots at 608. The aggregation 608 may be based upon parking criteria received at 604, for example. According to one aspect, aggregation may filter out parking spots based upon the parking criteria, for example. That is, for example, if a traveler indicates (e.g., via a traveler preference) that he or she desires parking spots within a quarter mile radius of a destination, parking spots which do not meet this criteria may be removed from consideration. According to one aspect, parking data feed may aggregate parking information 608 based upon feedback of 616, for example. In one embodiment, feedback may comprise parking information related to an occupancy status (e.g., occupied, reserved, and/or vacant) for a parking spot, for example. For example, a traveler may have an actual arrival time, anticipated arrival time, actual departure time (e.g. actual usage), and/or and anticipated departure time (e.g., anticipated usage). To this end, the aforementioned feedback times may be used to track 606 and/or aggregate 608 parking spots, for example. That is, for example, if a first traveler has an anticipated arrival time (e.g., associated with a first parking spot) of 11 AM and an anticipated departure time of 3 PM, a second traveler searching for a parking spot in that window (e.g., 11 AM to 3 PM) may be not be presented with the first parking spot at least because the first traveler has indicated an anticipated occupancy from 11 AM until 3 PM. In one embodiment, feedback may comprise GPS feedback from travelers, for example. To this end, if a first traveler makes a reservation for a parking spot, but GPS associated with the first traveler indicates that the first traveler cannot meet the reservation (e.g., the traveler is too far away and/or the traveler is late for the reservation), then feedback may update a parking database accordingly. For example, if a GPS signal associated with a first traveler indicated that the first traveler is one hundred miles away from a corresponding reserved parking spot, with a reservation starting in five minutes, then feedback to the parking database may be provided to release the reserved parking spot based upon a reality factor (e.g., it would be unrealistic for the first traveler to make his or her reservation).

According to another example, if it is detected that a first traveler is running late such that a first reservation associated with the first traveler would overlap with a second reservation for a second traveler, then feedback may be provided to update the parking database and re-route the first traveler to a different parking spot such that no overlap occurs. For example, if a first traveler makes a first reservation for a first parking spot from 9 AM until 12 PM, a second traveler makes a second reservation for the same first parking spot from 12 PM until 3 PM, the first traveler may be re-routed to a second parking spot if his or her anticipated arrival time shifts to 10 PM and/or an anticipated departure time associated with the first traveler changes to 1 PM, for example. Travelers may be re-routed based upon traffic in a parking lot and/or garage and/or anticipated traffic, for example. To this end, if a parking reservation system makes a determination that anticipated traffic will reach a threshold, one or more travelers may be re-routed accordingly.

At 610 a parking selection may be received (e.g., from a traveler and/or a portable device of the traveler). In one embodiment, the parking selection may be made by the traveler, while another embodiment may provide for the selection to be automatically made (e.g., such as by utilizing a selection algorithm), for example.

At 612, a reservation may be provided for the parking spot associated with the parking selection. In one embodiment, a traveler may be provided with an alert to confirm the reservation (e.g., provide a date, time, and/or location associated with the parking spot reservation). The reservation may be provided based on a number of parking factors. For example, the reservation may be provided based on parking criteria provided 604 by the traveler. For example, if a traveler desires a low cost parking spot, a reservation for a corresponding parking spot may be provided 612. However, since parking is generally fluid and/or dynamic, a traveler may not always be able to park at a desired location, for example. If a reserved parking spot is occupied, it may be in the traveler's interest (e.g., quicker) to navigate to another parking spot, for example. Accordingly, if it is detected (e.g., tracked 606 and updated in the parking database 616) that a reserved spot is unavailable (e.g., occupied), an updated reservation may be provided 612 for the traveler. In one embodiment, if a parking garage comprises a high parking density (e.g., a high occupancy percentage), a traveler may be re-routed and provided with an updated reservation 612 to facilitate quicker parking, for example. In another embodiment, if a traveler has a reservation at a parking spot, and traffic is heavy en route to the parking spot, an updated reservation may be provided 612 to another parking spot, for example. Further, a traveler may be reassigned parking spots based on parking distribution and/or parking density of a parking lot and/or parking garage, for example. To this end, if it is anticipated that a parking garage will not fill up, then a reservation may be provided for travelers such that the parking distribution may be based upon a checkerboard fill pattern, for example. In another embodiment, if a parking garage is anticipated to fill (e.g., based on an event, such as a game or based on reservations, for example), reservations may be provided based upon a consecutive fill pattern (e.g., and pricing adjusted accordingly).

At 614, the selected spot may be associated with respective coordinates (e.g., latitude and/or longitude, GPS coordinate, street address, point of interest, etc.). Additionally, alerts may be provided at 614 to facilitate parking for the traveler. For example, a traveler may be alerted to confirm that the traveler is parked at the spot reserved for him or her. Conversely, if a traveler attempts to park at a spot already reserved for another traveler and/or not at a spot reserved for the traveler, an alert may be generated and/or provided accordingly.

The parking database may be updated 616 based upon updated parking information and/or feedback received, indicating a status of a parking spot, for example. The received feedback may be based upon an anticipated arrival (e.g., such as a reservation, for example) or may be based upon an actual arrival of a traveler (e.g., GPS indication that the traveler has entered a parking lot). The exemplary method 600 ends at 618 thereafter.

Figure 7:
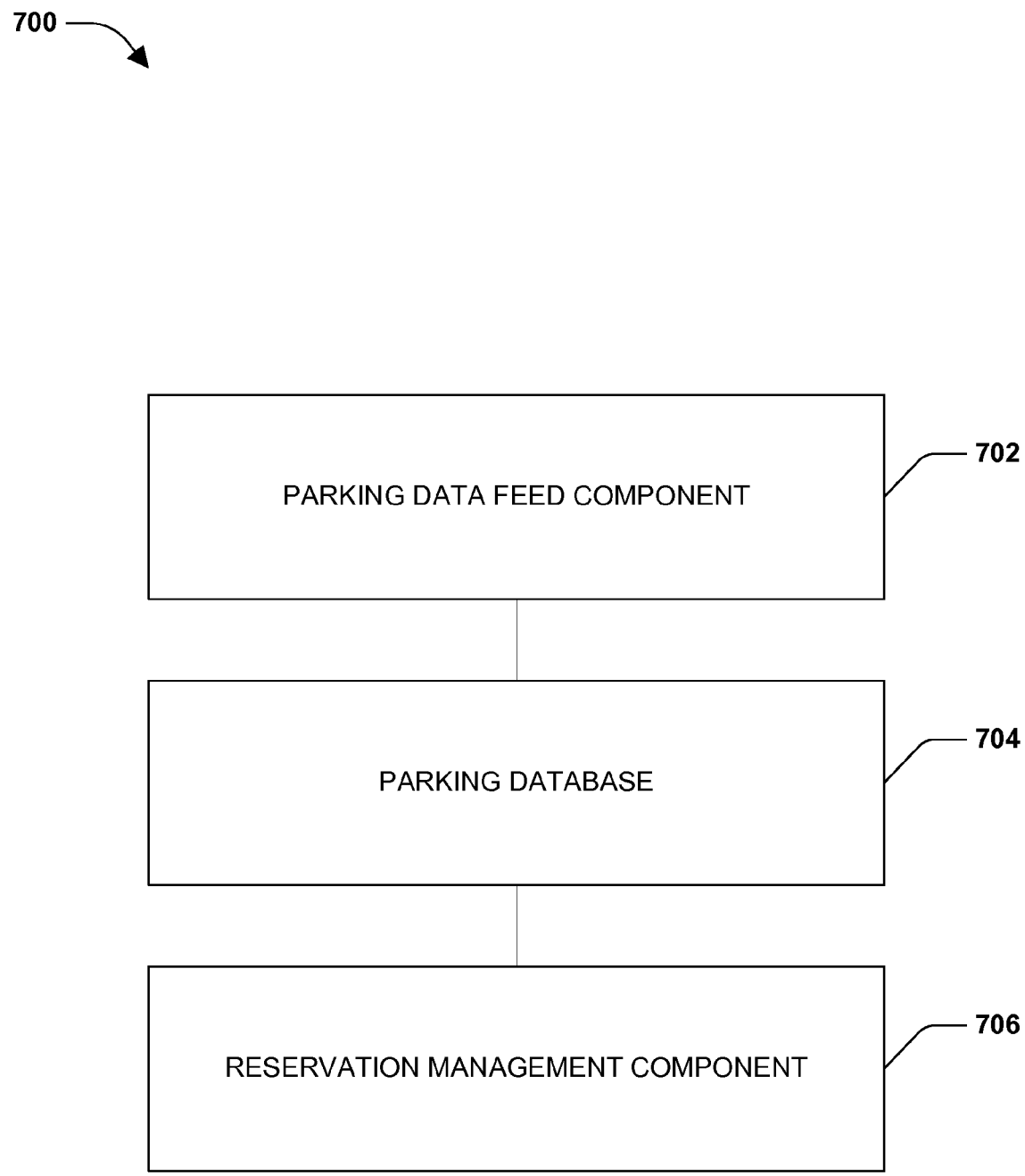
FIG. 7 is a component diagram of an exemplary system for parking resource management.

FIG. 7 is a component diagram of an exemplary system for parking reservation management. A parking data feed component 702 may be configured to aggregate and/or update a parking database 704 and/or a parking data feed with parking information associated with parking spots. Parking database 704 may be configured to associate respective parking spots with coordinates on a map, for example.

A reservation management component 706 may be configured to update the parking data feed and/or the parking database 704 based upon feedback (e.g., a reservation, an inquiry regarding availability, or a confirmation associated with parking spots), for example. In one embodiment, feedback comprising a reservation may initiate a hold for a parking spot by the reservation management component 706. In another embodiment, if feedback comprises an inquiry regarding availability of a parking spot, the reservation management component may provide statistics related to the availability of the spot (e.g., based upon current conditions, date, time, input conditions, etc.). For example, if a traveler inquires about a parking spot at noon on a Friday, the reservation management component 706 may pull historical data pertaining to the availability of the selected spot and/or neighboring spots on Fridays, the availability of the spot at noon, and/or the availability for the selected parking spot at noon on Fridays, for example. Additionally, if the feedback comprises a confirmation (e.g., of arrival and/or departure of an occupant for a parking spot), the reservation management component may update the parking database 704 and/or parking data feed accordingly.

Figure 8:
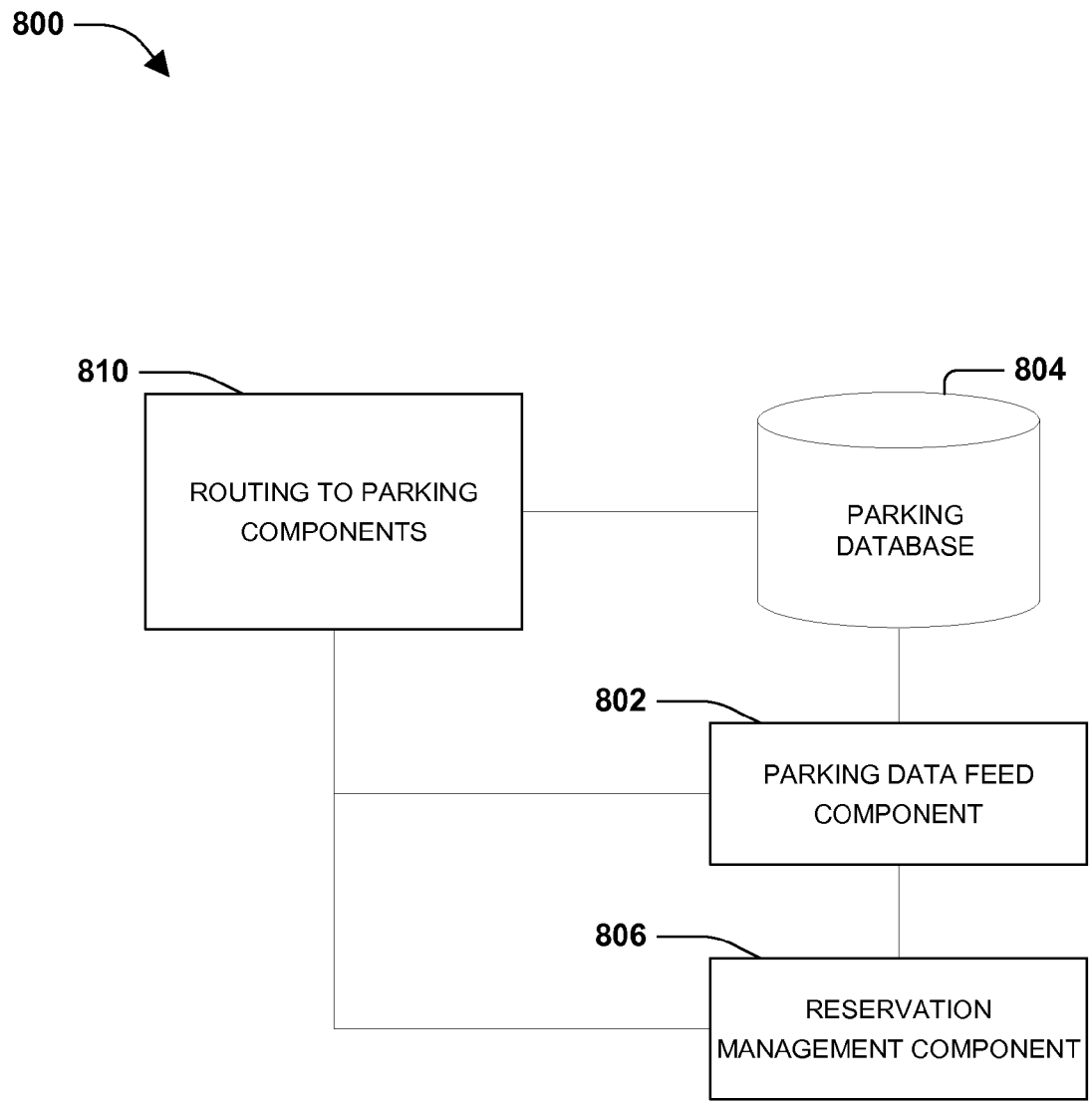
FIG. 8 is a component diagram of an exemplary system for parking resource management.

FIG. 8 is a component diagram of an exemplary system for parking reservation management. Parking data feed component 802 may be configured to update parking database 804. Reservation management component 806 may be configured to manage parking information housed by parking database 804.

Additionally, parking database 804, parking data feed component 802, and reservation management component 806 may be configured to interact with routing to parking components 810. For example, reservation management component 806 may be configured to provide real time parking information to routing to parking components 810 to facilitate travel. That is, for example, if a traveler enters New York Stadium as a destination, reservation management component 806 may alert routing to parking components 810 that parking garages within a one mile radius (e.g., based on received user preferences from routing to parking components 810) of New York Stadium are at 95% capacity (e.g., real time parking information and/or an associated threshold), and automatically enable parking based route navigation (e.g., navigation to a parking spot) via the routing to parking components 810, for example. In one embodiment reservation management component 806 may be configured to send a digital ticket to routing to parking components 810 to facilitate entry and/or exit to a parking spot and/or access to transportation to and/or from the parking spot to a destination (e.g., and vice versa). Routing to parking components 810 may comprise routing component 410, navigation component 420, parking component 430, public transit component 440, and/or display component 450 of FIG. 4, for example. According to one aspect, parking management component 806 may be configured to provide a map of parking spots, comprising coordinates associated with respective spots, and a parking status for a time frame (e.g., occupied, vacant, and/or reserved). In one embodiment, a traveler may scroll through different time frames to see which parking spots are available at different times, for example.

It will be appreciated that the components of FIG. 3, FIG. 4, FIG. 7, and/or FIG. 8 may be configured to perform any one or more of the acts provided by FIG. 1, FIG. 2, FIG. 5, and/or FIG. 6, for example.

Figure 9:
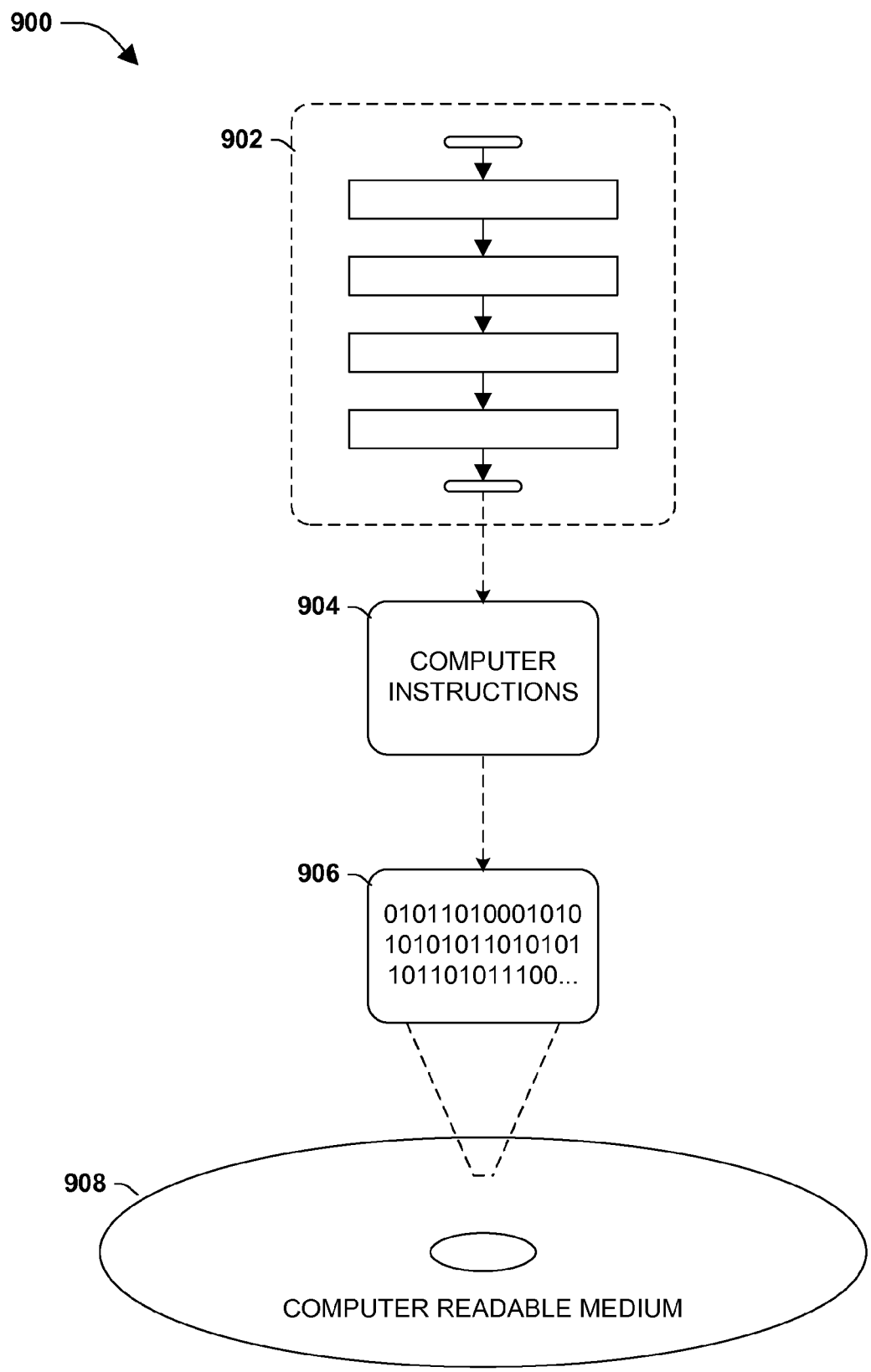
FIG. 9 is an illustration of an exemplary computing environment where one or more of the provisions set forth herein may be implemented.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary methods 100 and/or 500 of FIGS. 1 and 5, respectively, for example. In another such embodiment, the processor-executable instructions 904 may be configured to implement a system, such as at least some of the exemplary systems 300 and/or 700 of FIGS. 3 and 7, respectively, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processing unit, a processing unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
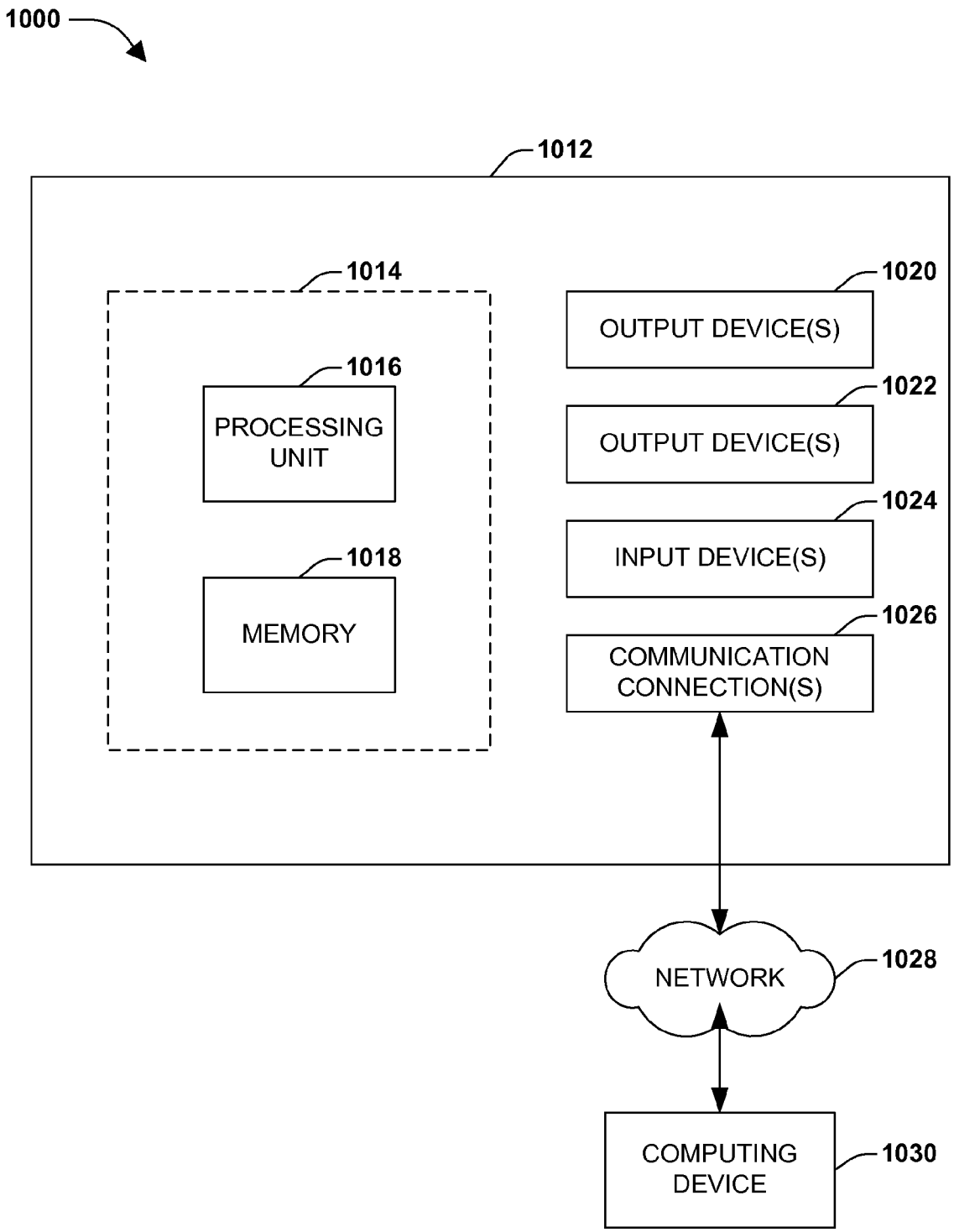
FIG. 10 is an illustration of an exemplary computer-readable medium (e.g., device) comprising processor-executable instructions configured to embody one or more of the provisions set forth herein.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held and/or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof.

In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in respective embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

What is claimed is:

1. A method, comprising:
    aggregating parking information associated with one or more parking spots to a parking data feed to generate aggregated parking information;
    providing the aggregated parking information to a user;
    receiving a reservation for a first parking spot of the one or more parking spots from the user;
    monitoring a location of the user relative to the first parking spot responsive to the receiving; and
    updating the reservation responsive to determining that the user will not arrive at the first parking spot by a time specified in the reservation based at least in part on the monitoring, at least some of the method implemented at least in part via a processing unit.

2. The method of claim 1, the aggregating parking information comprising monitoring one or more parking meters.

3. The method of claim 1, the updating comprising releasing the reservation for the first parking spot.

4. The method of claim 1, the updating comprising:
    reserving a second parking spot of the one or more parking spots for the user; and
    rerouting the user to the second parking spot.

5. The method of claim 1, at least some of the one or more parking spots associated with one or more parking spot coordinates.

6. The method of claim 1, comprising providing an alert based at least in part on a proximity to the first parking spot.

7. The method of claim 1, comprising updating the parking data feed by marking the first parking spot as unavailable based at least in part on at least one of the reservation.

8. The method of claim 1, the monitoring comprising monitoring GPS feedback associated with the user.

9. The method of claim 1, the providing comprising providing a map of at least one of one or more available parking spots, one or more reserved parking spots, or one or more taken parking spots.

10. The method of claim 4, the rerouting comprising rerouting the user based at least in part on traffic.

11. A system for managing parking resources, comprising:
    one or more processing units; and
    memory comprising instructions that when executed by at least one of the one or more processing units perform a method, comprising
    aggregating parking information associated with one or more parking spots to a parking data feed to generate aggregated parking information;
    providing the aggregated parking information to a user;
    receiving a reservation for a first parking spot of the one or more parking spots from the user;
    monitoring a location of the user relative to the first parking spot responsive to the receiving; and
    updating the reservation responsive to determining that the user will not arrive at the first parking spot by a time specified in the reservation based at least in part on the monitoring.

12. The system of claim 11, the aggregating parking information comprising monitoring one or more parking meters.

13. The system of claim 11, the updating comprising releasing the reservation for the first parking spot.

14. The system of claim 11, the updating comprising:
    reserving a second parking spot of the one or more parking spots for the user; and
    rerouting the user to the second parking spot.

15. The system of claim 11, at least some of the one or more parking spots associated with one or more parking spot coordinates.

16. The system of claim 11, the method comprising providing an alert based at least in part on a proximity to the first parking spot.

17. A computer-readable storage medium comprising computer-executable instructions that when executed perform acts, comprising:
    aggregating parking information associated with one or more parking spots to a parking data feed to generate aggregated parking information;
    providing the aggregated parking information to a user;
    receiving a reservation for a first parking spot of the one or more parking spots from the user;
    monitoring a location of the user relative to the first parking spot responsive to the receiving; and
    updating the reservation responsive to determining that the user will not arrive at the first parking spot by a time specified in the reservation based at least in part on the monitoring.

18. The computer-readable storage medium of claim 17, the providing comprising providing the aggregated parking information based at least in part on an anticipated arrival time of the user to a region spatially proximate the one or more parking spots.

19. The computer-readable storage medium of claim 17, the updating comprising:
    reserving a second parking spot of the one or more parking spots for the user; and
    rerouting the user to the second parking spot.

20. The computer-readable storage medium of claim 19, the updating comprising identifying the second parking spot based at least in part on a desired parking distribution.

* * * * *